(12) United States Patent
Ganter

(10) Patent No.: US 7,121,014 B2
(45) Date of Patent: Oct. 17, 2006

(54) POSITIONING AID AND METHOD FOR ASSISTING IN ALIGNING HEAVY MACHINES

(75) Inventor: Udo Ganter, Freiberg am Neckar (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/898,050

(22) Filed: Jul. 20, 2004

(65) Prior Publication Data

US 2005/0022411 A1 Feb. 3, 2005

(30) Foreign Application Priority Data

Aug. 1, 2003 (DE) ................. 103 36 039

(51) Int. Cl.
*G01D 21/00* (2006.01)
(52) U.S. Cl. .......................... 33/645; 33/613
(58) Field of Classification Search ............ 33/645, 33/613
See application file for complete search history.

(56) References Cited

U.S. PATENT DOCUMENTS

| 2,671,242 A | 3/1954 | Lewis |
| 4,036,345 A | 7/1977 | Webb |

FOREIGN PATENT DOCUMENTS

| DE | 1 500 867 | 3/1972 |
| DE | 92 06 556 U1 | 8/1992 |
| DE | 42 22 191 A1 | 8/1994 |
| DE | 100 17 507 A1 | 10/2001 |
| DE | 10017507 A1 * | 10/2001 |
| GB | 1109760 | 4/1968 |
| WO | 00/56638 | 9/2000 |

\* cited by examiner

*Primary Examiner*—Yaritza Guadalupe McCall
(74) *Attorney, Agent, or Firm*—Laurence A. Greenberg; Werner H. Stemer; Ralph E. Locher

(57) ABSTRACT

A positioning aid for aligning a heavy machine is fitted to the underside of the heavy machine and is to be brought as desired into contact with a base support or floor. The positioning aid includes at least one aligning element for floatingly mounting the heavy machine in one plane when the positioning aid contacts the floor. A heavy heavy machine has a first movement system and the positioning aid. A method of aligning a heavy machine with a first movement system and a positioning aid includes coarsely positioning the heavy machine with the first movement system on a floor. The positioning aid is extended, so that the first movement system loses contact with the floor and is then floatingly mounted. The heavy machine is freely rotated and displaced on the positioning aid. The heavy machine is lowered onto immovable adjustable feet when reaching the desired position of the machine.

3 Claims, 4 Drawing Sheets

POSITIONING AID AND METHOD FOR ASSISTING IN ALIGNING HEAVY MACHINES

BACKGROUND OF THE INVENTION

Field of the Invention

The invention relates to a positioning aid for assisting in aligning a heavy machine, the positioning aid being fitted to the underside of the heavy machine and to be brought as desired into contact with a base support or floor. The invention also relates to a method for assisting in aligning a heavy machine with the positioning aid.

Typically, devices of the afore-mentioned type serve for moving a heavy machine to a position, for example in a factory hall, wherein the heavy machine is to operate. In this regard, by the term heavy machine there is understood to mean a machine which is so heavy that it cannot be lifted by a human being or can be lifted only with very great effort, for example a machine tool. Such heavy machines often do not have to assume a specific position in the room but instead a position relative to another machine. This is particularly often widespread in further processing within the graphic industry wherein, for example, various further machines such as further folding stations, delivery devices, collecting devices or packaging machines and so forth are connected with a folding machine. In contrast with presses or machine tools or printing machines, for example, the position of which is to remain unchanged whenever they have reached the final position thereof, in the field of further processing, configuration changes have to be carried out more frequently, for example depending upon the format of the sheets to be processed, the final appearance of the product or the number of products to be produced, for example in the selection of a suitable feeder or delivery.

Therefore, such heavy machines generally have adjustable feet and a movement system which allow the heavy machines to be moved into other positions, as required. In the prior state of the art, that is usually achieved by a pair of pedestal rollers, which are fitted to two corners of the respective heavy machine and, respectively, an aligning rigid axle, and a pair of steering rollers, which are fitted to the opposite corners of the heavy machine and, respectively, having a movable axle. That movement system, made up of those four rollers, can either be extended and retracted, or the adjustable feet are extensible or retractable, respectively, in order to fix the machine in an exact or accurate position.

That configuration of a movement system is advantageous, on one hand, because the steering and pedestal rollers do not make any especially great demands upon the composition of the base, and permit the device to be positioned with some practice. However, maneuvering is less convenient due to the rigid pedestal rollers, because movement can be effected only over very large radii, and it is necessary to cover a considerable distance forwards and backwards in order to achieve a displacement in the axial direction of the pedestal rollers. On the other hand, maneuvering a heavy machine which rolls on two pairs of steering rollers would be virtually impossible.

SUMMARY OF THE INVENTION

It is accordingly an object of the invention to provide an improved positioning aid for assisting in aligning heavy machines and a corresponding method for assisting in aligning heavy machines, which overcome the hereinafore-mentioned disadvantages of the heretofore-known devices and methods of this general type and which position heavy machines in one plane.

With the foregoing and other objects in view, there is provided, in accordance with the invention, a positioning aid for aligning a heavy machine. The positioning aid is fitted to the underside of the heavy machine and is to be brought as desired into contact with a base support or floor. The positioning aid comprises at least one aligning element for floatingly mounting the heavy machine in one plane when the positioning aid is in contact with the base support or floor.

In accordance with another feature of the invention, the aligning element includes a first housing and a spherical roller fitted in the first housing.

In accordance with another feature of the invention, the aligning element further includes a second, inner housing. A runner plate which is disposed in the second housing has a side facing away from the spherical roller and represents a contact surface with the floor.

In accordance with a further feature of the invention, the positioning aid further includes springs connecting the first housing and the second housing to one another for producing automatic centering of the runner plate relative to the spherical roller when the runner plate is not loaded by the spherical roller.

In accordance with an added feature of the invention, the runner plate is formed of hardened steel.

In accordance with an additional feature of the invention, the positioning aid further includes pneumatic cylinders for adjusting the aligning elements vertically.

With the objects of the invention in view, there is also provided a method of aligning a heavy machine with a first movement system and a positioning aid. The method comprises the steps of: a) coarsely positioning the heavy machine with the first movement system on a floor; b) extending the positioning aid, so that the first movement system loses contact with the floor and is then floatingly mounted; c) freely rotating and displacing the heavy machine on the positioning aid; and d) lowering the heavy machine onto immovable adjustable feet when the desired position of the heavy machine has been reached.

In accordance with another mode, the method of the invention further includes additional steps between steps c) and d): c1) lowering the heavy machine onto immovable adjustable feet or the first movement system; and c2) repeating the sequence of steps b), c) and c1) until step d) is reached.

With the objects of the invention in view, there is additionally provided a method of aligning a heavy machine with a first movement system and a positioning aid. The method comprises the steps of: a) coarsely positioning the heavy machine with the first movement system on a floor; b) laying a suitable runner plate under the positioning aid; c) extending the positioning aid, so that the first movement system loses contact with the floor; d) freely rotating and displacing the heavy machine on the positioning aid; and e) lowering the heavy machine onto immovable adjustable feet when the desired position of the heavy machine has been reached.

With the objects of the invention in view, there is furthermore provided a heavy machine, comprising a first movement system for coarse positioning, and a positioning aid having at least one aligning element for floatingly mounting the heavy machine in one plane when the positioning aid is in contact with a base support or floor.

In accordance with another feature of the invention, the heavy machine is a further processing machine in the graphics industry sector.

Thus, the invention of the instant application relates to a positioning aid for aligning heavy machines. The positioning aid is fitted to the underside of a respective heavy machine and is able to be brought into contact with the floor as desired. The positioning aid includes at least one aligning element being configured so that the heavy machine is mounted floatingly in one plane when the positioning aid is in contact with the floor. In this regard, a floating mounting is understood to mean a mounting which permits easy rotation and translation of the heavy machine in one plane. A floating mounting is achieved, for example, by four balls which are freely rotatably mounted and represent a single point of contact with the floor. The fact that a floating mounting of a device permits these two degrees of freedom for moving the machine in one plane and is not subject to any constraints means that the heavy machine can be rotated and displaced easily in one plane in order to reach the optimum position thereof, for example in alignment with a further machine. In addition, according to the invention, the positioning aid can be brought into contact with the floor as desired. The positioning aid is consequently extended by possible adjustments as required, namely, for example, in order to carry out a precise adjustment of the machine, and can then be retracted again.

In an advantageous construction of the device according to the invention, at least one aligning element has a first housing wherein a spherical roller is fitted. Advantageously, all of the aligning elements are structurally identical. The term spherical roller is understood to mean a multiplicity of running or roller balls, for example formed of hardened steel, which is mounted on a multiplicity of smaller load-bearing balls. Spherical rollers of this type are frequently found in fixed supports over which heavy loads that themselves have no drive are rolled. In this invention, preference is given to spherical rollers which are mounted upside down, wherein the spherical roller is uncovered at the bottom, and the load-bearing rollers are fitted above the spherical roller. In the invention of the instant application, the spherical rollers are therefore carried along as well, because they are firmly connected to the first housing. The use of spherical rollers permits effortless displacement and rotation in any desired directions in one plane, even in the case of heavy loads.

The problem with such a structure is that the spherical rollers can run only on very solid surfaces, because movement is no longer possible if, in their inverted installation, they sink into the layer underneath because of the weight of the machine. Therefore, in a further embodiment, provision is made to provide plates which have a hardened upper side, the plates being placed under the positioning aids before the positioning aids are lowered. The floating mounting of the heavy machine with the afore-described advantages regarding the mobility of the heavy machine can then be produced within the extent of the dimensions of these plates. This application is advantageous if, for example, relatively great distances have to be covered in one direction, in particular along the axis of the pedestal rollers. In one exemplary application, it is conceivable, for example, to displace a heavy machine in this way by more than half the machine width, parallel to the center line between the pedestal rollers. Clearly, the plates used herein are hardened steel plates, which are advantageously fixed to wooden boards for improved handling.

In an alternative advantageous construction of the device according to the invention, the positioning aid additionally has a second housing wherein there is disposed a running or runner plate which, on the side thereof facing away from the spherical roller, represents a contact surface with the floor. In this manner, the positioning aid always carries with it the runner plate with which the spherical roller produces the floating mounting of the heavy machine, so that it is possible to dispense with storing runner plates and having to lay these, possibly with a great deal of effort, under the positioning aids.

In a further development of this advantageous construction of the device according to the invention, the first and second housings are connected to one another by springs, which produce automatic centering of the runner plate in relation to the spherical roller when the runner plate is not loaded by the spherical roller. In order for the heavy machine to be movable with the positioning aid extended, it is clear that the runner plate must remain in a fixed location, which already results merely from the weight of the heavy machine when the positioning aid is extended. The extent of the floating movement of the device is therefore dependent only upon the size of the runner plate. However, in order to ensure that the positioning aid does not show under the heavy machine in a striking manner, the runner plate advantageously has just those dimensions which are typically required during the fine positioning of a heavy machine of the afore-mentioned general type. Due to the addition of the springs, the runner plate is always re-centered in relation to the spherical roller when the positioning aid is retracted again. This even makes it possible to cover relatively large distances effortlessly, regardless of the composition of the base, provided that the base is substantially flat, by doing so in a caterpillar movement, i.e., by extending the positioning aid, displacing the machine in relation to the runner or running plate in the desired direction, retracting the positioning aid, extending the positioning aid with the runner or running plate re-centered, and so forth. The runner or running plate is advantageously formed of hardened steel.

In an advantageous construction of the device according to the invention, the aligning elements are adjustable vertically by pneumatic cylinders. Other equivalent vertical adjustment devices are likewise conceivable, such as spindles and so forth.

Other features which are considered as characteristic for the invention are set forth in the appended claims.

Although the invention is illustrated and described herein as embodied in a positioning aid and a method for assisting in aligning heavy machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
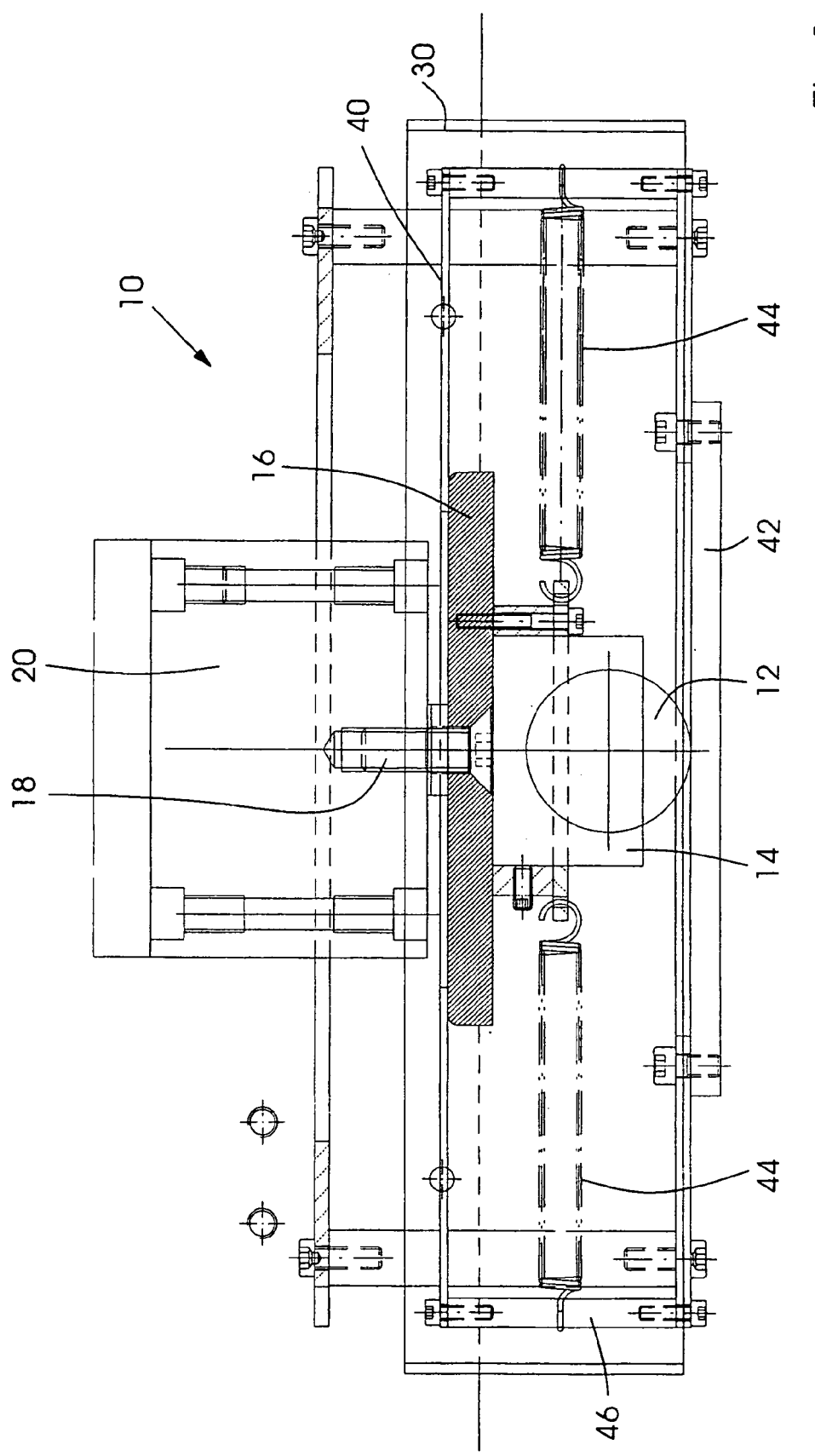
FIG. 1 is a diagrammatic, side-elevational view of an embodiment of an aligning element of a positioning aid according to the invention.

Referring now to the figures of the drawing, it is noted that they are diagrammatic views of the device according to the invention. Further drives and/or guides, controls and cam disks, generally known and required for the operation of the device, are only illustrated diagrammatically and are only described in general terms below.

Figure 2:
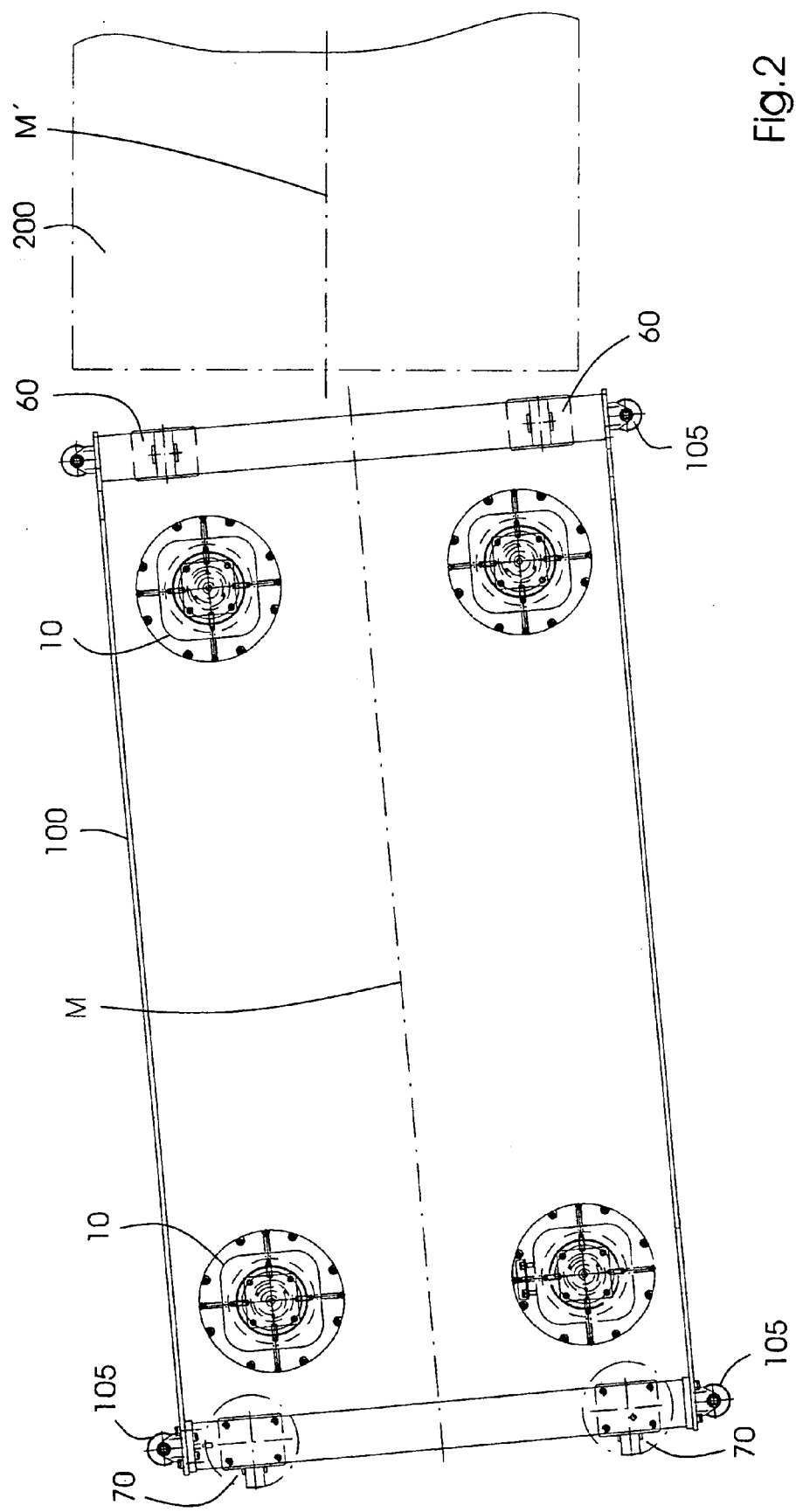
FIG. 2 is a bottom-plan view of an embodiment of a heavy machine provided with four aligning elements of the positioning aid according to the invention.
Figure 3:
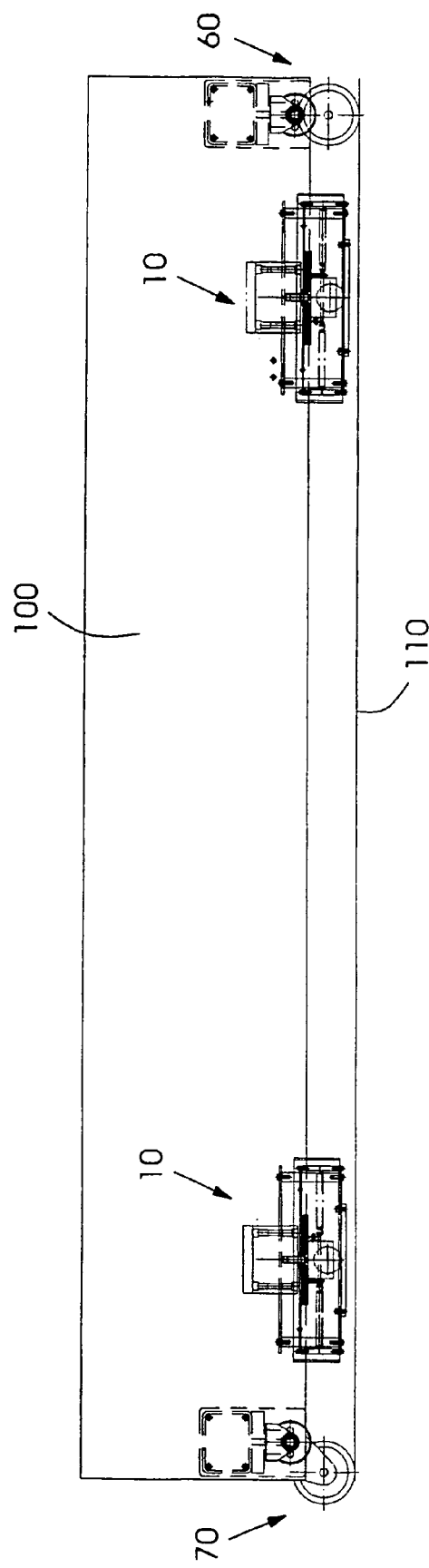
FIG. 3 is a side-elevational view of an embodiment of a heavy machine provided with aligning elements of the positioning aid according to the invention, and showing the positioning aid in a retracted condition.
Figure 4:
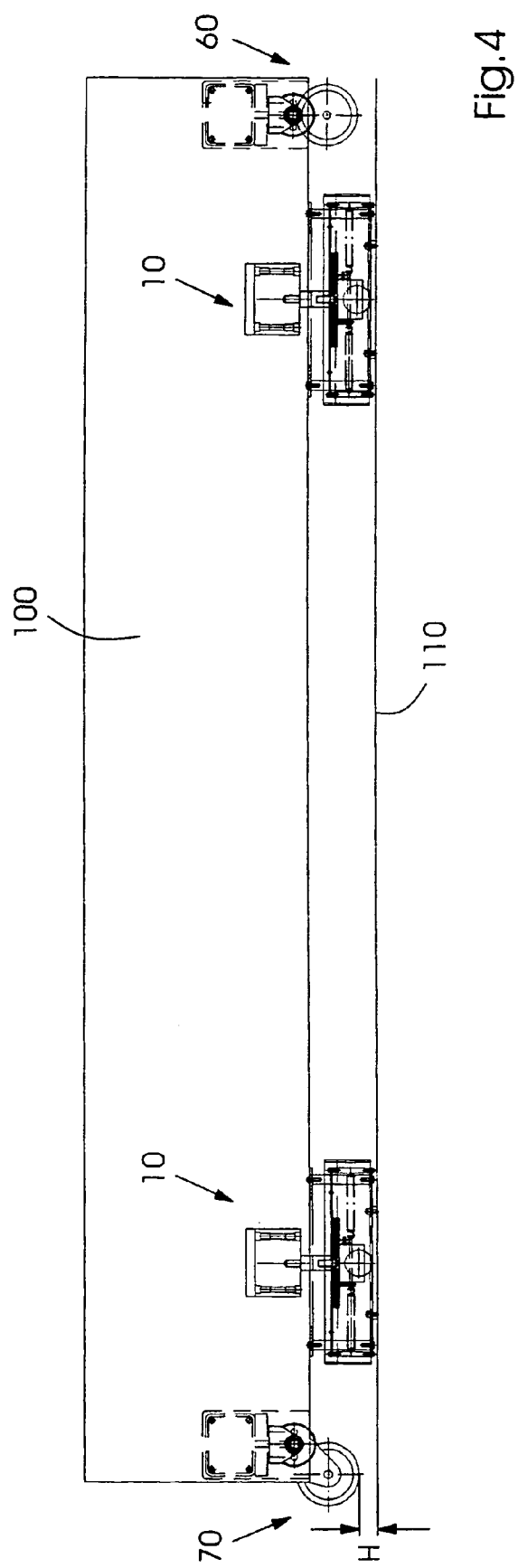
FIG. 4 is a view similar to that of FIG. 3 showing the positioning aid in an extended condition.

FIG. 1 shows an aligning element 10 of a positioning aid of a heavy machine 100 represented in FIGS. 2 to 4. A pneumatic cylinder 20, which is fixed to the heavy machine 100, permits the height of the aligning element 10 to be adjusted via a piston 18 and a corresponding non-illustrated control system known to those skilled in the art. The piston 18 ends in a fixing plate 16. A spherical roller housing 14 for a running or roller ball 12 is fitted to a side of the fixing plate 16 facing away from the piston 18. Within the spherical roller housing 14, a large number of non-illustrated load-bearing balls are provided, against which the running or roller ball 12 is braced and which permit free rotation of the running or roller ball 12 in all directions. The spherical roller housing 14 is also suitably constructed to prevent the running or roller ball 12 from falling out downwardly.

Likewise disposed on the fixing plate 16 is a first housing 30, which primarily serves for protecting the roller ball 12. A second housing 40 is disposed additionally within the first housing 30. The second housing 40 rests loosely on the fixing plate 16 and, in this region, is formed with a cutout, so that unimpeded displacement of the first housing 30 in relation to the second housing 40 by the piston 18 is possible. Radially mounted springs 44 each have one respective end secured to the spherical roller housing 14 and another respective end secured to rods 46 mounted on the second housing 40, for centering the second housing 40 relative to the roller ball 12. Underneath the roller ball 12, a runner or running plate 42 of hardened steel is fitted to the second housing 40. The roller ball 12 can roll on the runner or running plate 42 without sinking into a floor 110 (shown in FIGS. 3 and 4) when the positioning aid is lowered. In this case, the underside of the runner or running plate 42 forms a contact surface with the floor 110.

In a simpler embodiment, which is not separately illustrated, the second housing 40 with the elements disposed therein, in particular the springs 44 and the runner plate 42, are omitted from the positioning aid. In order to provide a floating mounting, such an embodiment requires additional non-illustrated runner plates, which are laid under the positioning aid. These non-illustrated runner plates, for example wooden boards with a running layer of hardened steel, can assume virtually any desired shape, in this case, for example depending upon the path which the thus floatingly mounted heavy machine 100 is intended to travel.

FIG. 2 shows the heavy machine 100, which is to be positioned in relation to a previously positioned further machine 200.

In particular, center lines M, M' of the two machines 100, 200 are to be aligned with one another. The heavy machine 100 is fitted with adjustable feet 105, as is common, for example, in a further processing area in the graphics industry sector, and with a first movement system 60, 70, made up of a pair of pedestal rollers 60 and a pair of steering rollers 70. The steering rollers 70 and the pedestal rollers 60 can be extended and retracted by vertical adjustment devices in order to set the heavy machine 100 down onto the adjustable feet 105 on the floor 110 (note FIGS. 3 and 4) and to raise the heavy machine 100. As an option, the adjustable feet 105 are also extensible and retractable by vertical adjustment devices. In the case of the machines or apparatuses which have just been mentioned, i.e., for example folding machines, feeders, deliveries, pilers, strapping apparatuses, three-side trimmers, collating machines, stackers and so forth, it is typical that they must be assembled in different ways, depending upon a particular product. Consequently, it is not uncommon for the machines or apparatuses to have the location thereof changed relatively frequently. It has, therefore, been known in the prior art to equip these machines or apparatuses with an afore-mentioned first movement system 60, 70 in order to be able to make the position changes. However, since pedestal rollers 60 permit movement in only one direction and produce constraints for the mobility of the steering rollers, maneuvering, particularly parallel to the center line M of the heavy machine 100, becomes tiresome and requires frequent pushing to and fro until the machines 100, 200 are aligned properly with one another.

FIGS. 3 and 4 serve to illustrate the method of the invention in which the positioning aid according to the invention is advantageously employed. In addition to the first movement system, with which the heavy machines 100 can, for example, be pushed very easily from one hall to the next, the heavy machine 100 has aligning elements 10 which are either in a retracted state as in FIG. 3 or in an extended state as in FIG. 4. The steering rollers 70 and the pedestal rollers 60 lose adhesion with the floor, as illustrated in FIG. 4, and are lifted a vertical distance H off the floor 110, so that the heavy machine 100 is then floatingly mounted on the positioning aid and can be moved comfortably into the prescribed position therefor. Since the displacement of the heavy machine 100 by the positioning aid is restricted by the size of the runner plates 42, it may possibly be necessary for the positioning aid to be extended and retracted repeatedly in a caterpillar movement in order to implement the desired displacement.

If necessary or desirable, the positioning aid can have non-illustrated sensors for monitoring the underside of the positioning aid. In this way, it is possible to prevent, for example, part of the body of servicing or installation personnel from being located under the runner plate before the positioning aid is lowered.

In the embodiment illustrated in FIGS. 2 to 4, four aligning elements 10 are provided for the heavy machine 100. However, the actual number can differ therefrom, and it is even conceivable for the positioning aid to have only a single aligning element 10, for example between the two pedestal rollers 60, and for only the pedestal rollers 60 to be raised for fine adjustment. For larger heavy machines 100, it is conceivable to provide six or more of the positioning aids, in order to permit a uniform distribution of the loads. Due to the floating mounting of the positioning aids, the number of aligning elements 10 has no upper limit placed thereon.

The device according to the invention finds particular use in further processing within the graphic industry, but is in principle suitable for any machine or apparatus which is to be moved in one plane.

This application claims the priority, under 35 U.S.C. § 119, of German Patent Application 103 36 039.5, filed Aug.

1, 2003; the entire disclosure of the prior application is herewith incorporated by reference.

I claim:

1. A positioning aid for aligning a heavy machine, the positioning aid comprising:

at least one aligning element to be fitted to an underside of the heavy machine and to be brought as desired into contact with a base support or floor;

said at least one aligning element floatingly mounting the heavy machine in one plane upon said at least one aligning element being in contact with the base support or floor;

said at least one aligning element including a first housing, a spherical roller fitted in said first housing, a second, inner housing, and a runner plate disposed in said second housing, said runner plate having a side facing away from said spherical roller and defining a contact surface with the base support or floor; and said at least one aligning element including springs connecting said first housing and said second housing to one another producing automatic centering of said runner plate relative to said spherical roller upon said runner plate not being loaded by said spherical roller.

2. The positioning aid according to claim 1, wherein said runner plate is formed of hardened steel.

3. The positioning aid according to claim 1, further comprising:

pneumatic cylinders for adjusting said aligning element vertically.

* * * * *